(No Model.) 2 Sheets—Sheet 2.
O. L. NEISLER.
CULTIVATOR.
No. 356,289. Patented Jan. 18, 1887.
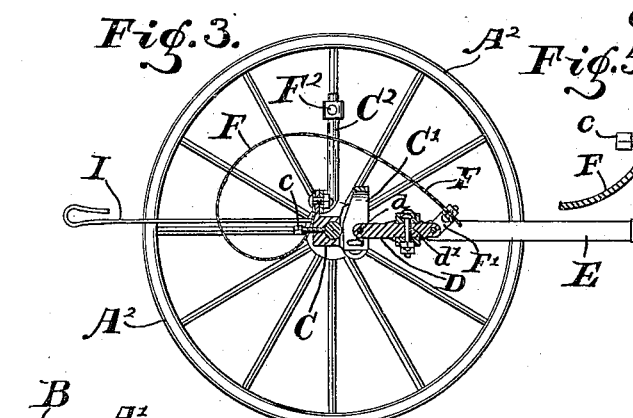
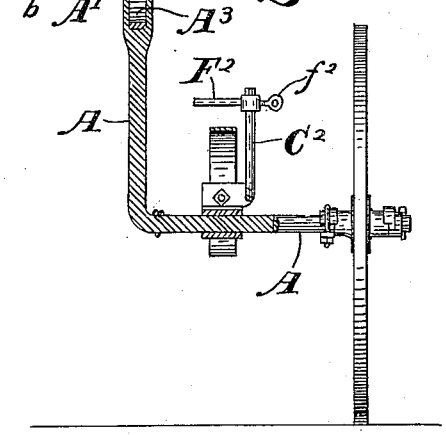
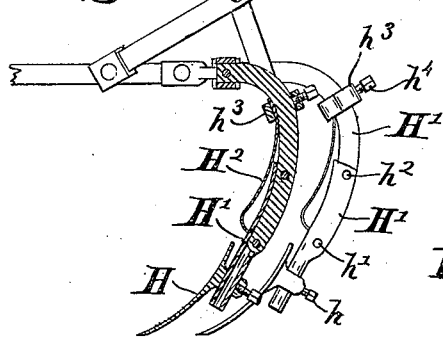
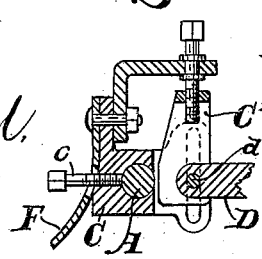
WITNESSES. INVENTOR.

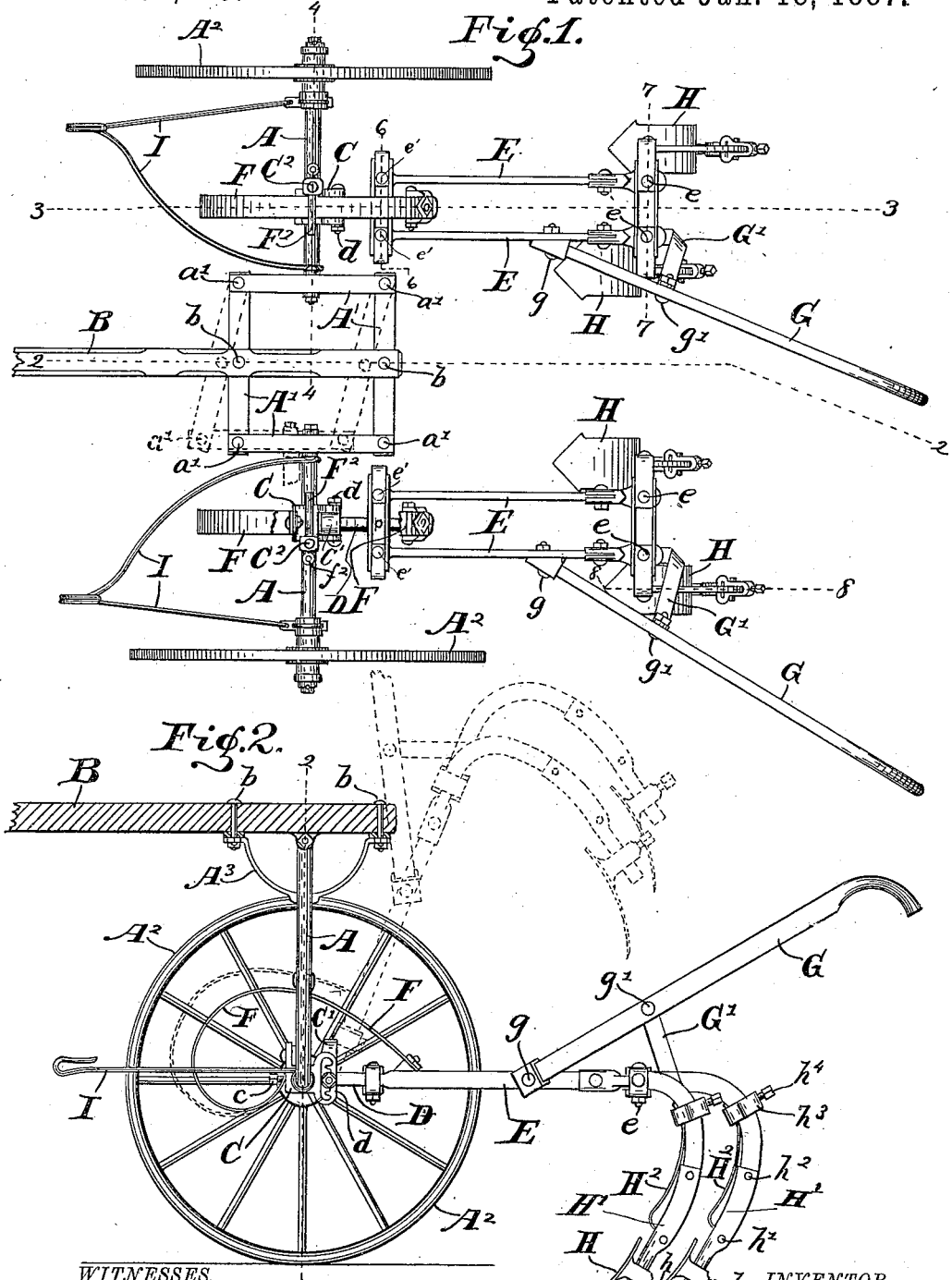

UNITED STATES PATENT OFFICE.

OSCAR L. NEISLER, OF INDIANAPOLIS, INDIANA.

CULTIVATOR.

SPECIFICATION forming part of Letters Patent No. 356,289, dated January 18, 1887.

Application filed April 27, 1886. Serial No. 200,270. (No model.)

*To all whom it may concern:*

Be it known that I, OSCAR L. NEISLER, of the city of Indianapolis, county of Marion, and State of Indiana, have invented certain new and useful Improvements in Cultivators, of which the following is a specification.

My said invention consists in a cultivator of improved construction generally.

The improvements in the several parts will first be described in detail, and then pointed out in the claims.

Referring to the accompanying drawings, which are made a part hereof, and on which similar letters of reference indicate similar parts, Figure 1 is a top or plan view of a cultivator embodying my said invention; Fig. 2, a central vertical sectional view through the same, as seen from the dotted line 2 2 in Fig. 1, showing one side of the cultivator in elevation; Fig. 3, a detail sectional view through one of the gangs of plows as seen from the dotted line 3 3 in Fig. 1; Fig. 4, a transverse sectional view of one side of the cultivator, looking toward the left from the dotted line 4 4 in Fig. 1; Fig. 5, a detail sectional view, on an enlarged scale, similar to a portion of Fig. 4; Fig. 6, a transverse sectional view through the cross-bar to which the front ends of the plow-beams are connected, looking toward the left from the dotted line 6 6 in Fig. 1; Fig. 7, a transverse view, looking toward the right from the dotted line 7 7 in Fig. 1, through the rear cross-bar and the plow-beams; Fig. 8, a detail sectional view through one of the plows and its shank, as seen from the dotted lines 8 8 in Fig. 1; and Fig. 9, a view similar to a portion of Fig. 5, showing an alternative means of adjusting the forward end of the short beam or bar relatively to the block.

In said drawings, the portions marked A represent the sections of axle; A', the frame-work by which they are connected; B, the tongue secured to said frame-work; C, adjustable blocks secured to the axles by which the plow-beams are attached thereto; D, short beams or bars adjustably secured to said blocks; E, the main plow-beams connected to said short beams; F, springs which serve to sustain the plow-beams under certain circumstances, as will be hereinafter more fully described; G, the plow-handles; H, the plows, and I draft-rods to which the single-trees are attached in operation.

The axles A consist of preferably round bars or rods of metal bent at right angles, the horizontal portion extending through and forming the spindles for the wheels and the vertical portions extending up and connecting to the frame-work A'. To said horizontal portions are connected the plow-beams and the draft-rods, and the wheels $A^2$ are mounted thereon. The frame by which the upper ends of these axle portions are connected is composed of four sides, the two which run transversely of the machine being pivotally secured to the tongue B by pivot-bolts $b$ and the two which run longitudinally of the machine being secured to the upright parts of the axle portions A. These four sides are pivotally connected together at the corners by pivot-bolts $a'$, and thus either side of the plow is permitted to move in advance or to the rear of the other (see dotted lines in Fig. 1) as the animals drawing the cultivator move relatively to each other, and this without changing the vertical position of these parts of the axle portions, which are arranged vertically. The upper ends of the vertical parts of the axle portions A are bifurcated, and semicircular braces $A^3$ (see particularly Fig. 2) are secured to the corners of the frame-work A' and pass between the two sides of said vertical parts. These braces thus not only serve to secure said axle portions in the ordinary manner, but also permit sidewise movement, as the sides of said upper end of the axle rest against the sides of the brace at the point where it passes between them.

The tongue B is secured to the front and rear sides of the frame-work A' by pivot-bolts $b$, as usual, and extends forward and serves the usual purposes of a tongue in a machine of this character.

The blocks C are mounted loosely upon the horizontal parts of the axle portions A, and are secured in any desired position thereon by set-screws $c$, as is shown most plainly in Fig. 5. The rear portions of these blocks are bifurcated, and between the two sides of each is secured the short beam or bar D, which connects the plow-beams proper thereto. These sides are provided with slots, so that the attachment of said short beams or bars may be varied or adjusted vertically. This adjustment may be effected, of course, in many different ways. The means which I have shown in the principal drawings include, preferably, several notches (see Fig. 2) in the rear sides of these slots, in which the pivot-bolts $d$, which secure said short beams or bars to said blocks, may rest, and yoke-shaped portions C', which are preferably slotted both vertically and horizontally (see Figs. 3 and 5) and pass astride said short beam or bar. When it is desired to adjust said beam or bar in relation to the block C, this device C' is raised up (either by the adjusting-screw shown by dotted lines in Fig. 5, or otherwise) until the horizontal slot registers with the pivot-bolt which connects the short beam or bar to the block. Said pivot-bolt is then moved into said horizontal slot, and, together with said device, is raised or lowered to a point opposite the notch in which it is desired that it shall rest. Said pivot-bolt is then moved into said notch, and the device C' is pushed down so that its vertical slots pass over said pivot-bolt, and thus said pivot-bolt is held into said notch securely, as will be readily understood. These notches in the block C and slots in the device C' may be omitted, if desired, and said device left to be supported wholly by the adjusting-bolt $c'$, as shown in Fig. 9.

The short beams or bars D are connected to the block C in the manner just described, and to the cross-bars on the main plow-beams by bolts $d'$, as shown, and thus, in connection with the blocks C, serve to connect the plow-beams to the axle. The bolts $d$, by which these short beams D are connected to the blocks C, serve as pivots on which said short beams may turn, and thus the plows are permitted to be moved up and down.

The main beams E of the plows are double, and consist of two longitudinal parts secured by pivot-bolts to two transverse parts, the forward one of which is secured to the short beam or bar by a bolt, $d'$, as before described, and the rear one of which is secured to the rear ends of the side pieces by bolts $e$, while said side pieces are secured to said front cross-bar by the bolts $e'$. Thus said plow-beams are each practically a rectangular frame connected at the corners by pivot-bolts, and said plow-beams will thus be permitted to be swung from side to side without varying the relation of the plows connected thereto to each other. The front and rear portions of said plow-beams are each composed of four parts—a top and a bottom part in the form of a straight bar, (which, however, are preferably grooved on their outer side,) and end pieces which are U-shaped and slipped over the ends of said top and bottom parts, and, together with the bolts, which pass through them, secure them together. The top and bottom portions are also slotted, and thus the sides of the plow-beams and the plows themselves are adapted to be moved farther from or nearer to each other, and there secured by the pivot-bolts, which pass through said several parts.

The springs F are substantially in the form of a figure 6 laid upon one side. At one end they are rigidly connected to the blocks C, and at the other ends are secured to clips F', which are secured to the inner ends of the short beams or bars D by pivot-bolts $f'$. They thus serve to sustain a portion of the weight of the plows, and when said plows are raised up hold them in raised position while the machine is being driven from place to place. To aid in the latter result, and also upon occasion to prevent their operation, I provide either upon the vertical parts of the axle portions A or upon separate standards $C^2$, secured to the blocks C, a projecting arm, $F^2$, which is secured to said vertical part or standard by a set-screw, $f^2$, and is permitted when said set-screw is loosened to revolve freely or move vertically thereon. When it is desired to secure the spring against upward movement, this arm is swung around to a position over said spring and there secured by the set-screw, being adjusted vertically to just that point where it will accomplish the desired result. When it is desired to secure the plows in raised position, (as when driving from one field to another,) the set-screw is loosened, the arms swung around, so that the springs will pass above them, and then swung back underneath said springs and secured in position. By this means the operation of these springs can be fully controlled as desired, as the arm can be secured at any height upon the vertical portion of the axle or standard.

The plow-handles G are substantially the ordinary plow-handles, and are secured to the plow-beams E, at the lower end, by means of clip-bolts $g$, and to the rear portion of said plow-beams by brace-bars G', extending upwardly therefrom, to which they are connected by bolts $g'$. These brace-bars are so attached to the plow-beams as to be rigid with the longitudinal portions thereof.

The plows H are provided with shanks H', which are formed in two parts secured together by pivots $h'$, and provided with brake-pins $h^2$, in the usual manner. The shovels are secured to the shanks by set-screws or bolts $h$. I have provided, in connection with these plows, a spring device by which said plows may be held to their work without the use of brake-pins, if desired; or these springs may be added to supplement said brake-pins. Said springs $H^2$ are secured to the rigid portion of the plow-shanks by clips $h^3$ and set-screws $h^4$, and they extend down and rest against the lower or pivoted portion of the shanks. The force of the work upon the shovels throws the upper end of the pivoted shanks against said springs, and said springs act to hold them up to the work, as will be readily understood, while, should the shovels come in contact with an obstruction, the springs would give way and permit the plows to pass. Said springs, as shown, are so formed as to retain their engagements with the pivoted portions of the shanks, and after the obstruction has been passed restore the plows to operative position. As before stated, the ordinary wooden brake-pins $h^2$ may be used in addition, if desired.

The draft-rods I are not peculiar to this invention, and need no further description. They are secured to the axle portions A in any usual or desired manner.

Having thus fully described my said invention, what I claim as new, and desire to secure by Letters Patent, is—

1. The combination, in a cultivator, of two axle portions, A, each consisting of a horizontal and a vertical part, a jointed frame-work, A', to the side pieces of which said portions are connected at their upper ends, and a tongue secured to the front and rear portions of said frame-work by pivot-bolts.

2. The combination, in a cultivator, of two axle portions, A, each consisting of a horizontal and a vertical part, the vertical parts being bifurcated at the upper ends, a flexible frame-work, A', to which said upper ends are connected, and braces $A^3$, connected to the corners of said frame-work and passing between the sides of said bifurcated ends.

3. The combination, in a cultivator, of two axle portions, A, each consisting of a horizontal and vertical part, the vertical parts being bifurcated at their upper ends, a frame-work, A', consisting of four sides connected by pivot-bolts at the corners, semicircular braces $A^3$, also secured to the corners of said frame-work by said pivot-bolts and passing between the sides of said bifurcated upper ends, bolts whereby said upper ends are connected to said frame-work, and a tongue connected to the front and rear sides of said frame-work by pivot-bolts.

4. The combination, in a cultivator, with the axles and plow-beams, of blocks C, mounted upon said axles, having bifurcated and slotted rear portions to which the plow-beams are connected, said slots being notched in their rear sides for the reception of the pivot-bolt which connects the plow-beams thereto, a locking device for securing said pivot-bolt in said notches, whereby said pivot-bolt may be secured at a higher or lower position therein.

5. The combination, in a cultivator, with the axles and plow-beams, of a block having a bifurcated and slotted rear portion to which the plow-beams are connected, said slots being provided with notches in their rear sides to receive the pivot-bolt, and a yoke-shaped piece, C', having vertical and horizontal slots therein, and which is thus adapted to serve as a keeper for the pivot-bolt, substantially as set forth.

6. The combination, in a cultivator, of the axle, blocks C, secured thereon, short beams D, pivoted to said blocks, plow-beams E, connected to said short beams, and springs connected at one end to said blocks C and at the other end to a clip, F', pivoted to the rear end of said short beam and said clip F', all substantially as set forth.

7. The combination, in a cultivator, of the axle, blocks C, rigidly mounted thereon, the plow-beams connected to said blocks by horizontal pivots, springs secured at one end to said blocks and at the other to said plow-beams, and arms adjustably connected to the vertical parts of the axle or to independent vertical standards, and adapted to be secured either above or below the springs and limit their movement in one or the other direction, substantially as described.

8. The combination, in a cultivator, with the plow-beams, of the plow H, shank H', and spring $H^2$, said shank being divided and pivoted together by a pivot, $h'$, the lower part extending up beyond said pivot, a brake-pin, $h^2$, in said upper end, and said spring being secured rigidly to the rigid part of said shank at its top end, and at its lower end bearing against said lower or pivoted part above said pivot, substantially as set forth.

9. The combination, in a cultivator plow-beam, of two sides and two ends connected together by pivot-bolts, said ends being each composed of a top and bottom and two end portions, the top and bottom portions being slotted and the end portions being in the form of a U, and passing over and connecting the top and bottom portions together, substantially as shown and described.

In witness whereof I have hereunto set my hand and seal, at Indianapolis, Indiana, this 24th day of April, A. D. 1886.

OSCAR L. NEISLER. [L. S.]

In presence of—
C. BRADFORD,
CHARLES L. THURBER.